United States Patent
Milo et al.

[11] Patent Number: 6,115,218
[45] Date of Patent: *Sep. 5, 2000

[54] TAPE SUPPORT SYSTEM FOR ARCUATE SCAN ROTATING HEAD

[75] Inventors: Richard K. Milo, Lake Forest; Gerald C. Green, San Diego; John M. Rottenburg, Lakeside, all of Calif.

[73] Assignee: Seagate Technology, Inc., Scotts Valley, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/859,516

[22] Filed: May 20, 1997

Related U.S. Application Data

[63] Continuation of application No. 08/337,304, Nov. 10, 1994, abandoned, which is a continuation-in-part of application No. 08/113,996, Aug. 30, 1993, Pat. No. 5,585,978.

[51] Int. Cl.⁷ .................... G11B 15/61; G11B 5/53
[52] U.S. Cl. .................... 360/130.22; 360/130.24; 360/84
[58] Field of Search ................ 360/83, 84, 85, 360/130.2, 130.21, 130.22, 130.23, 130.24, 130.3, 130.31, 130.32, 130.33, 107

[56] References Cited

U.S. PATENT DOCUMENTS

| | | | |
|---|---|---|---|
| 2,245,286 | 6/1941 | Marzocchi | 360/84 |
| 2,743,319 | 4/1956 | Thompson et al. | 360/84 |
| 2,750,449 | 6/1956 | Thompson et al. | 360/84 X |
| 2,772,328 | 11/1956 | Lyon | 360/70 |
| 2,859,973 | 11/1958 | Runge | 360/84 |
| 2,900,444 | 8/1959 | Camras | 360/84 |
| 2,926,018 | 2/1960 | Hoshino et al. | 360/107 X |
| 2,929,633 | 3/1960 | Hoshino et al. | 360/107 X |
| 3,031,533 | 4/1962 | Hoshino | 360/107 X |
| 3,054,861 | 9/1962 | Lyon | 360/84 |
| 3,079,469 | 2/1963 | Backers et al. | 360/84 |
| 3,320,371 | 5/1967 | Buch | 360/84 |
| 3,972,074 | 7/1976 | Vogel | 360/130.22 |
| 4,112,472 | 9/1978 | Hauke et al. | 360/102 |
| 4,348,706 | 9/1982 | Videc | 360/130.24 |
| 4,636,886 | 1/1987 | Schwarz | 360/84 |
| 4,647,993 | 3/1987 | Schwarz et al. | 360/84 |
| 5,585,978 | 12/1996 | Rottenburg et al. | 360/85 |
| 5,646,806 | 7/1997 | Griffith et al. | 360/130.22 |

FOREIGN PATENT DOCUMENTS

| | | |
|---|---|---|
| 0 172 609 | 2/1986 | European Pat. Off. . |
| 59-231703 | 12/1984 | Japan . |
| 61-063913 | 4/1986 | Japan . |
| 1-196783 | 8/1989 | Japan . |
| 2-089269 | 3/1990 | Japan . |
| 2240855 | 9/1990 | Japan . |
| 6290401 | 10/1994 | Japan . |
| 9326005 | 12/1993 | WIPO . |

*Primary Examiner*—William Klimowicz
*Attorney, Agent, or Firm*—Fliesler Dubb Meyer & Lovejoy LLP

[57] ABSTRACT

The present invention relates to a method and apparatus for engaging a magnetic tape with a transducer at a read/write zone for achieving consistent head-to-tape coupling throughout the intended recording location, especially at the edges of the tape. The transducer, located on the end face of the rotating transducer carrier, reads and writes arcuate information tracks generally laterally across the tape. The transducer traces a substantially circular transducing path through the read/write zone with the axis of rotation corresponding substantially to the center of the transducing path. A tape support system generally adjacent to the read/write zone positions the tape so that the transducer penetrates into a tape surface along a read/write location.

15 Claims, 14 Drawing Sheets

TAPE SUPPORT SYSTEM FOR ARCUATE SCAN ROTATING HEAD

This application is a continuation of Ser. No. 08/337,304, filed Nov. 10, 1994, now abandoned which was a continuation-in-part of application No. 08/113,996, filed Aug. 30, 1993, now U.S. Pat. No. 5,585,978.

BACKGROUND OF THE INVENTION

1. Field of the Invention

The present invention relates to a method and apparatus for selectively engaging a transducer located on the end face of a rotating transducer drum of an Arcuate Scan Head Assembly (ASHA) with a magnetic tape, and more particularly, a tape support system for achieving consistent head-to-tape coupling throughout the intended recording location, especially at the edges of the tape.

2. Description of the Related Art

Many commercial magnetic tape drive systems utilize a reel-to-reel transport system for passing magnetic tape past a substantially stationary read/write head. Information is typically placed on the tape in the form of a plurality of parallel tracks extending along the longitudinal axis of the tape. The stationary read/write head may have either a single channel or multiple channels. The read/write head may move laterally to read different tracks on the tape, but during the read/write operation the head is essentially stationary. Recording and playback is achieved by moving the tape longitudinally past a read/write zone. Since the read/write head is stationary, achieving good head-to-tape contact is relatively well known. For example, the tape may wrap around the head.

Another widely used tape drive uses a Vertical Helical Scan (VHS) head in which one or more heads are located on the outside of a rotating cylinder or drum. The tape moves over the side surface of the cylinder, wrapping partially around the surface of the cylinder. The cylinder is inclined with respect to the tape path so that each head traces a helical path along the tape. Again, contact between the head(s) and the tape can easily be maintained by wrapping the tape partially around the side surface of the cylinder.

The newly developed arcuate scanning tape drives (see PCT published application WO 93/26005, which is hereby incorporated by reference) utilize a rotating transducer drum with a generally planar end face containing transducers that engage with the tape plane as the tape moves past. In contrast to VHS drives, the axis of rotation of the transducer drum passes through the tape plane. Each transducer therefore reads/writes a sequence of arcuate tracks generally laterally across the tape, hence the name Arcuate Scanning Head Assembly, or ASHA.

With an ASHA, wrapping the tape around the end face of the drum means that the transducers are continuously engaged with the tape through the entire transducing path. This configuration results in accelerated wear on the tape and the read/write heads. Additionally, even though the read/write heads are switched off during a portion of the path opposite the intended recording zone traced by the transducers, the engagement of the heads with the tape results in signal cross-talk that creates noise in the system.

The front face of the transducer drum engaging with the tape surface rotates between approximately 7,500 to 15,000 rpm. Even higher speeds may be used in the future. If the end face of the drum is inserted into the tape plane, this rotation of the transducer drum against the tape plane creates opposing forces generally perpendicular to the longitudinal axis of the tape. In particular, one edge of the rotating drum creates a force transverse to the longitudinal axis of the tape while the opposite edge of the drum creates a force in the opposite direction, resulting in a tendency to twist the tape in the direction of drum rotation. Consequently, it is extremely difficult to achieve intimate head-to-tape contact, particularly at the edges of the tape.

Additionally, the transducers typically extend slightly above the end surface of the transducer drum, e.g., 0.0005 inches (0.0127 mm). If the end face of the transducer drum has the read/write heads located at a diameter larger than the width of the tape, which is generally the case, the transducers may impact on the edges of the tape, potentially causing premature tape failure and damage to the read/write heads.

SUMMARY OF THE INVENTION

The present invention relates to a method and apparatus for implementing a tape support system adjacent to a read/write zone for positioning a tape on an ASHA drive so that a transducer penetrates into a tape surface along a read/write location to achieve consistent head-to-tape coupling.

One embodiment of the tape support system has at least one tape support having a tape support surface extending generally laterally across the tape. A portion of the tape support surface may be convex or concave. The tape support may be an arm structure located adjacent to the read/write location. The tape support surface may flex the tape into a shape generally complementary to the shape of the transducer carrier so that longitudinal tape tension is generally uniform at the read/write zone.

The tape support surface may be located either above or below a datum plane defined by the transducer.

The tape support system may include a second tape support on the opposite side of the transducer carrier. The tape support surface of the second tape support may be located above the transducer datum plane. The magnetic tape may be contained in a cartridge. The tape support system may include a curved tape guide attached to the cartridge. The tape guide may be a curved or asymmetrical surface. A curvilinear wrap pin may also be attached to the cartridge.

In one embodiment, the axis of rotation of the transducer carrier is in a non-orthogonal relationship with the tape plane such that the read/write location is adjacent to the wrap pin. The distance between the read/write location and the wrap pin to achieve optimum transducer/tape interface is approximately 0.1" and 0.4". A conical end face on the transducer carrier may be combined with the right-hand tribology configuration describe above.

The cartridge may also include a tape support pad located behind the tape in the read/write zone. The tape support pad may be constructed of a compliant or rigid material. Alternatively, the tape support pad include a curved slot corresponding to the path traversed by the transducer along the read/write location.

Alternatively, the tape support system may include a tape support on the end face of the transducer carrier, extending above the datum plane of the transducer for supporting the tape adjacent to the read/write location. In one embodiment, the tape support is a curvilinear end face. Alternatively, the tape support may be a ridge around the periphery of the end face which extends below the datum plane of the transducer.

In yet another embodiment, the tape support system comprises at least one tape support having a tape support surface. The inner and outer surfaces of the tape support may either be straight or curved. In one embodiment, the tape support has a curved inside surface adjacent to the transducer carrier and a straight outside edge facing away from the transducer carrier. The inside surface is curved to generally conform to the shape of the transducer carrier and the straight outside edge being perpendicular to the longitudinal axis of the tape so that a generally planar tape surface is maintained through the read/write zone.

In another embodiment, the tape support system comprises a tape support platform interposed between the end face of the transducer carrier and the tape. The tape support platform has a tape support surface extending generally across the end face of the transducer carrier. A circular transducer slot is provided in which the transducers travel. A transducer opening is provided to permit engagement between the transducers and the tape. The tape support surface may include a straight transition edge perpendicular to the longitudinal axis of the tape. The tape support platform may include upper and lower tape guides generally parallel to the longitudinal axis of the tape.

In any of the disclosed embodiments, the end face of the transducer carrier may include an opening. A low pressure mechanism is provided for creating a low pressure condition between the tape and the end face of the transducer carrier. A low pressure distribution channel in fluid communication with the opening may be provided in the end face for distributing the low pressure condition across the end face. Preferably, the low pressure distribution channel is located adjacent to the transducer. Alternatively, the tape support platform may include a low pressure distribution channel in fluid communication with the opening for drawing the tape against the support surface.

The low pressure mechanism may include a shroud having an inner surface extending around the transducer carrier forming a chamber between the carrier and the inner surface of the shroud. A seal is positioned between the transducer carrier and the inner surface of the shroud to minimize the movement of air into the chamber while permitting free rotation of the carrier relative to the shroud. A transducer drum air vent is provided between the opening and the chamber to allow air to move between the center opening and the chamber. The drum air vent is located on the side of the seal opposite the front face. Blades are attached to the transducer carrier to promote air flow through the center opening in the transducer drum to create the low pressure condition between the tape and end face of the transducer carrier.

The method for engaging a magnetic tape with a transducer at a read/write zone comprises flexing the tape using any of the disclosed tape support systems to achieve consistent head-to-tape contact, especially at the edges of the tape.

The claimed tape drive includes any of the disclosed tape supports, together with the elements normally found in a drive to control movement of the tape past the read/write zone. The tape drive may also include a tape registration system that includes a registration arm which mechanically engages with a tape guide on a tape cartridge. Finally, it is contemplated that the above embodiments may be freely combined to create a comprehensive tape support system.

DETAILED DESCRIPTION OF THE PREFERRED EMBODIMENTS

The present invention relates to a method and apparatus for selectively engaging a transducer located on the end face of a rotating transducer drum with a magnetic tape. A variety of tape support systems are disclosed for positioning the tape so that the transducers penetrate into a tape surface along a read/write location.

Successful implementation of an arcuate-scan recording system requires consistent head-to-tape coupling across the width of the tape. Since the end face of the transducer drum penetrates into the tape surface, variation in the longitudinal tension across the web at the read/write zone causes amplitude variations in the reproduced signal, especially at the tape edges. Consequently, it is important to achieve consistent penetration of the read/write heads into the tape.

The penetration stiffness (force per unit tape deflection) is typically lower at the edges of the tape than at the center. The various tape support systems disclosed herein are designed to manipulate longitudinal tension of the tape to optimize edge coupling with the transducers.

Figure 1:
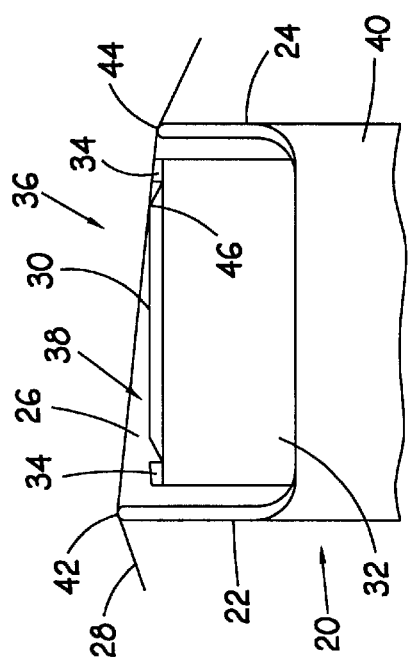
FIG. 1 is a side view of a tape support system including support arms and a tapered end face structure for isolated engagement of the magnetic tape with the read/write location of the circular transducing path.

It will be understood that the embodiments disclosed herein may represent components of an overall tape support system for an arcuate scanning tape drive, and as such may be freely combined. It also will be understood that the size of the angles and displacements of the tape, transducers, and drum in the drawings have been greatly exaggerated for clarity of description. For example, a typical transducer penetrates less than 0.0015" (0.0381 mm), and preferably between 0.0005" (0.0127 mm) and 0.001" (0.0254 mm) into the tape surface. FIG. 1 illustrates a side view of a rotary head transducer 20 with a pair of tape support arms 22 and 24. The tape support arm 22 (the passive support arm) is slightly longer than the tape support arm 24 (the active support arm), so that a separation 26 is created between the tape 28 and the portion of the end face 30 of the transducer drum 32 closest to the support arm 22. Consequently, rotating transducers 34 will only contact the tape 28 along a read/write location 36 of the generally circular transducer path (see FIGS. 4 and 5). The separation 26 prevents the transducer 34 from engaging the tape 28 during a non-contact or passive segment 38 of the transducing path, thus limiting head and tape wear in this area.

The datum of the active tape support arm 24 may be slightly below that of the transducers 34 on the drum 32, resulting in improved head-to-tape contact near the physical edges of the tape 28 and more consistent recording performance throughout the arc of the transducers 34 across the tape 28. Additionally, the forces between the transducers 34 and the tape 28 may be maintained at a relatively low level, thus increasing tape and head life.

For example, the difference in the datum of the transducers 34 and the active tape support arm 24 preferably is less than 0.025 mm (0.000984 inches). A 0.025 mm gap has been shown to allow adequate read/write performance to within 0.25 mm (0.00984 inches) of the physical edge of the tape 28. The above example corresponds to a tape support surface 44 which is straight and parallel to the end face 30 of the transducer drum 32. However, it will be understood that this example represents a general principle that may apply to a variety of end face and tape support configurations.

The support arms 22 and 24 are integrally formed as part of an outer shroud 40 which surrounds the transducer drum 32 (see e.g., FIG. 4), although it will be understood that they may be fixed relative to the transducer drum 32 in a variety of ways. The support arms 22 and 24 have curved tape support surfaces 42, 44, respectively, along the direction of tape travel, which minimizes the wear on the tape 28 and improves the head-to-tape contact at the edges.

The support arm 22 causes the tape 28 to be introduced to the transducer drum 32 at a slight angle such that the generally circular end face 30 of the drum 32 penetrates further into the center of the tape than at the edges. This penetration results in the tape 28 being longer in the center due to stretching.

As will be discussed in detail below, in some circumstances the end face 30 of the transducer drum 32 may have a non-planar shape. The end surface 30 of the transducer drum 32 is shaped to provide additional support to the tape immediately adjacent to the read/write location 36. As illustrated in FIG. 1, the end face 30 has taper point 46 adjacent to the transducers 34. Consequently, the tape 28 is supported by the taper point 46 on one side of the read/write location 36 and the support surface 44 on the other. The close proximity of the tape support locations 46, 44 results in improved head-to-tape coupling.

Figure 2:
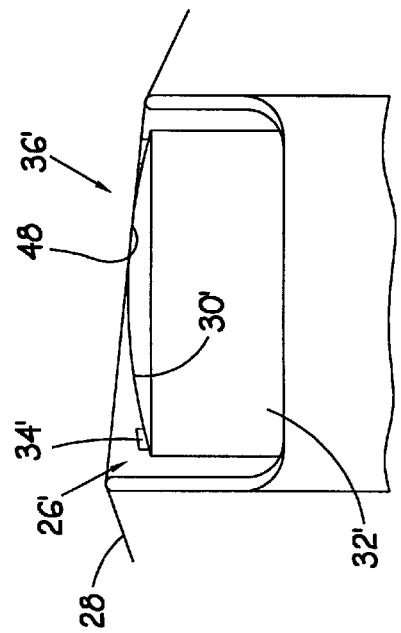
FIG. 2 is a side view of an alternate tape support system including tape supports and a curved end face structure for engaging the magnetic tape with the read/write location of the circular transducing path.

In an alternative embodiment illustrated in FIG. 2, the end face 30' of the transducer drum 32' has a curved or conical shape which supports the tape 28 at a location 48 adjacent to the transducers 34'. The curved or conical surface has the added advantage of reducing the likelihood that the rotating transducer drum 32' will damage the tape. While FIG. 2 illustrates a generally uniform curve, it will be understood that an asymmetrical curve may enhance head-to-tape coupling. For example, the end face 30' may be high adjacent to the transducer 34' to increase tape tension through the read/write location.

Figure 3:
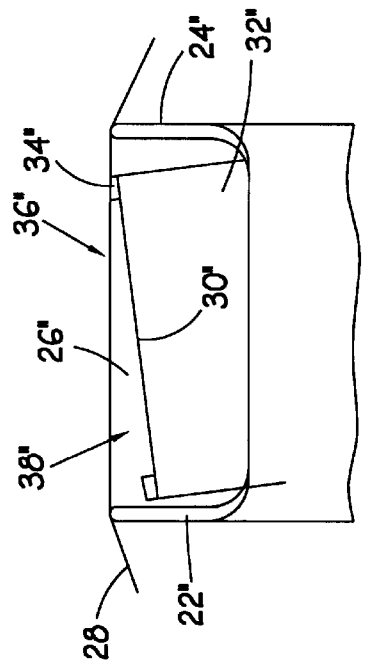
FIG. 3 is a side view of another alternate tape support system including support arms and an end face structure which is tipped in relation to the longitudinal axis of the tape so that the transducers engage with only the read/write location of the circular transducing path.

FIG. 3 is an alternate embodiment of the embodiment illustrated in FIG. 1 in which the support arms 22", 24" are substantially the same length. However, the transducer drum 32" is tipped at an angle relative to the tape 28 so that a separation 26" is formed proximate the non-contact segment 38" of the transducer path. Consequently, the transducer 34" penetrates into the tape 28 along the read/write location 36". It will be understood that it is possible to combine the tapered or curved end faces 30, 30' with the tipped transducer drum structure 32" illustrated in FIG. 3.

As discussed above, the separations 26, 26', 26" result in the tape 28 engaging the transducer drum at a slight angle resulting in greater head penetration at the center of the tape and possible variation in the longitudinal tension across the tape. Depending on the degree of head penetration, the head-to-tape coupling may be inconsistent, especially at the edges. A curved or contoured tape support may increase the longitudinal tension along the edge of the tape. Additionally, a contoured support may cup or pre-shape the tape to engage more favorably with the transducer drum end face 30, 30', 30".

Figure 19:
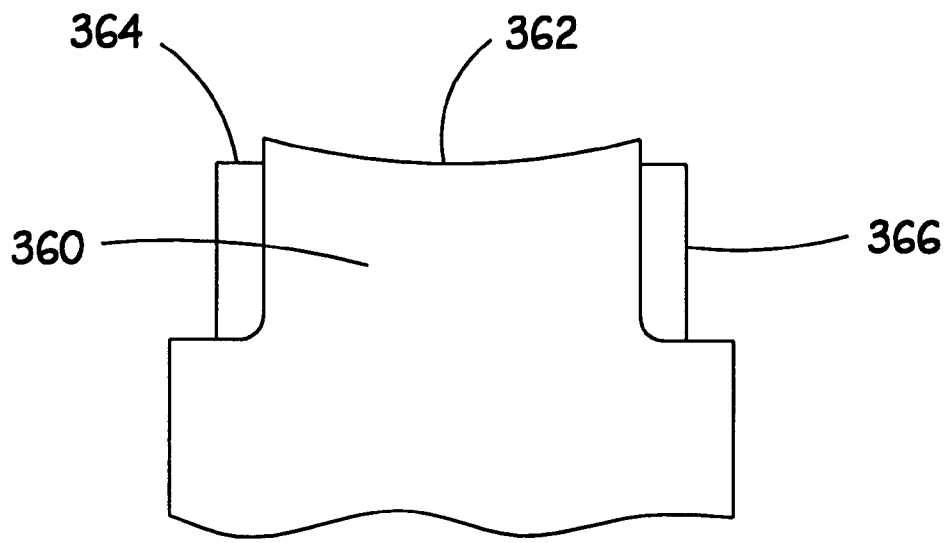
FIG. 19 is a side view of an alternate tape support arm with a concave tape support surface.

FIG. 19 illustrates a side view of an alternate tape support arm 360 with a concave tape support surface 362 which increases head-to-tape penetration toward the center of the tape (not shown). By reducing the relative penetration of the transducer drum 366 near the edges of the tape, the recorded arcs can be extended closer to the tape edge. The trade off is reduced head-to-tape contact pressure at the edges of the tape, which results in a lower output signal and an increased error rate. However, away from the tape edges the higher effective head-to-tape penetration gives higher contact pressures and thus better overall electromagnetic performance. Thus, the concave tape support 362 optimize recording performance throughout most of the arc, while simultaneously extending the usable arc length closer to the tape edges.

Figure 20:
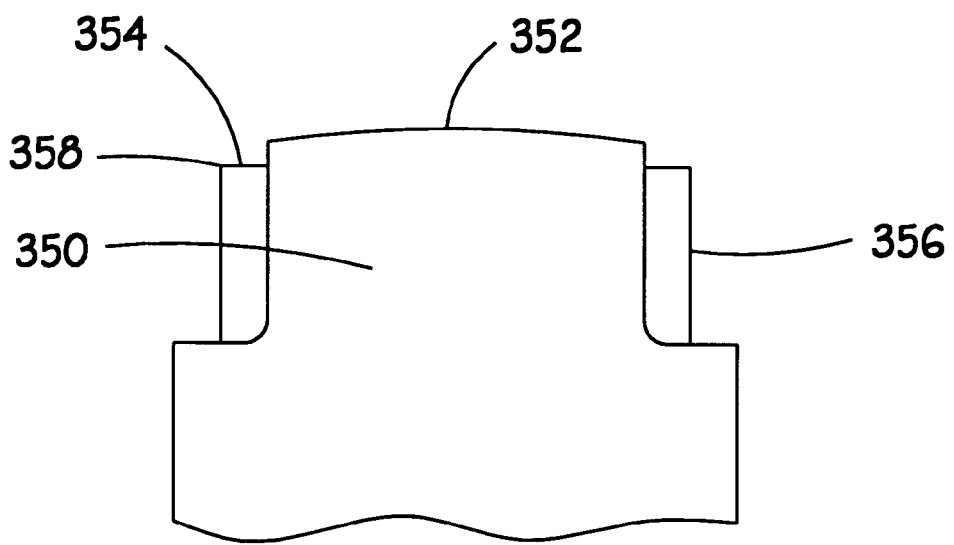
FIG. 20 is a side view of an alternate tape support arm with a convex tape support surface.

FIG. 20 is a side view of an alternate tape support arm 350 with a convex tape support surface 352. The tape support surface 352 is curved to flex the tape (not shown) into a shape that is complementary either to the end face 354 of the transducer drum 356 or to the circular edge 358 of the drum 356. The convex support 352 tends to hold the middle portion of the tape (not shown) farther away from the end face 354 of the drum 356 and bends the edges of the tape toward the end face 354. Contoured tape support 352 has proven especially effective when used in combination with the non-planar end face structures 20, 20' disclosed in FIGS. 1 and 2. It will be understood that it is possible to combine the convex, concave or straight tape support surfaces on a single transducer assembly. For example, a convex tape support may be used adjacent to the read/write location and a straight tape support may be used on the opposite side of the transducer drum.

Figure 15:
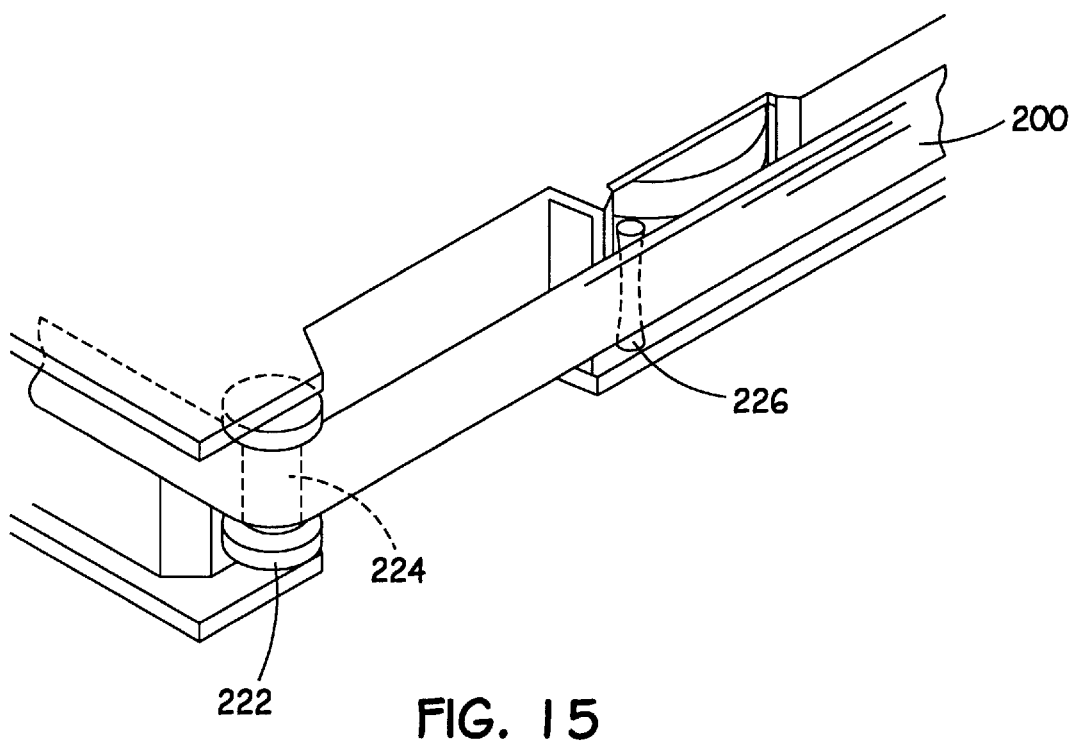
FIG. 15 is a perspective view of a cartridge for holding a magnetic tape in which a cylindrical tape support and a curved wrap pin are attached to the cartridge housing.
Figure 16:
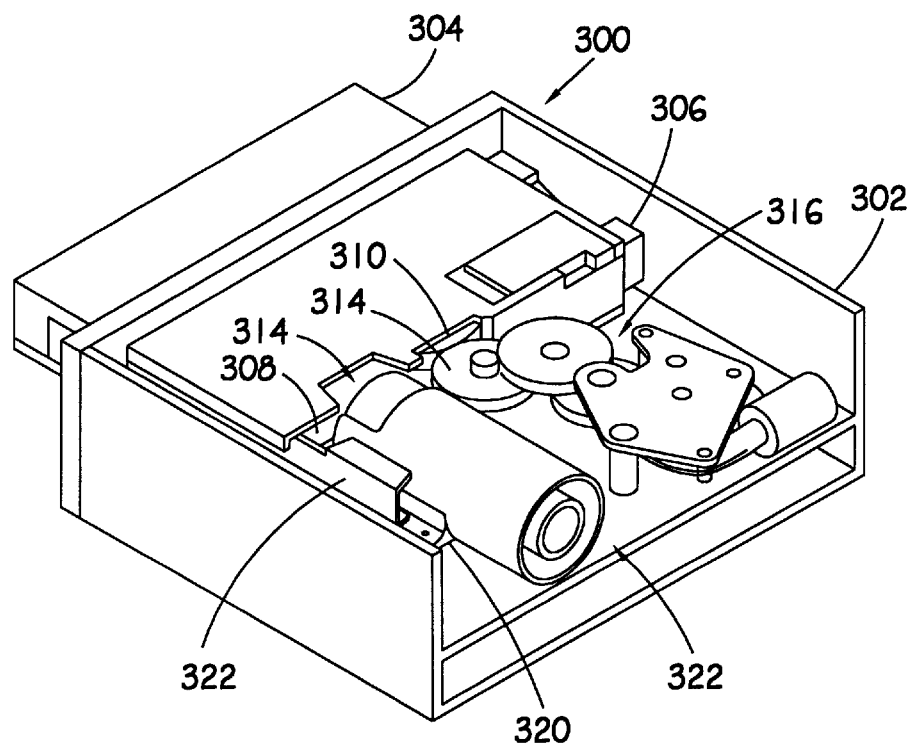
FIG. 16 is a perspective view of an exemplary arcuate scanning tape drive.

FIG. 16 is a perspective view of an exemplary arcuate scanning tape drive 300. A frame 302 receives a double-reel belt-driven cartridge 304. The tape drive 300 includes a conventional cartridge loading mechanism 306 which receives the cartridge 304, opens a tape cover 312 to expose tape 308, and positions the tape 308 for recording and playback. The tape 308 is driven longitudinally when a force is applied to a tape capstan roller 310. The cartridge includes a tape guide (not shown) attached to the cartridge 304. (see discussion of FIGS. 9, 10, and 15, below). The tape 308 travels left to right through a read/write zone 314, where it engages with transducers on the end face (see e.g., FIG. 4) of a rotary head transducer assembly 322.

The force for longitudinally advancing the tape is applied to the capstan roller 318 by a transmission assembly 316. For purposes of this exemplary illustration, the transmission assembly 316 includes a capstan roller 318 which engages the tape capstan 310, causing the tape 308 to advance through the read/write zone 314. It will be understood that a variety of transmission devices are suitable for this purpose and the above illustration in no way limits the scope of the present invention.

Figure 4:
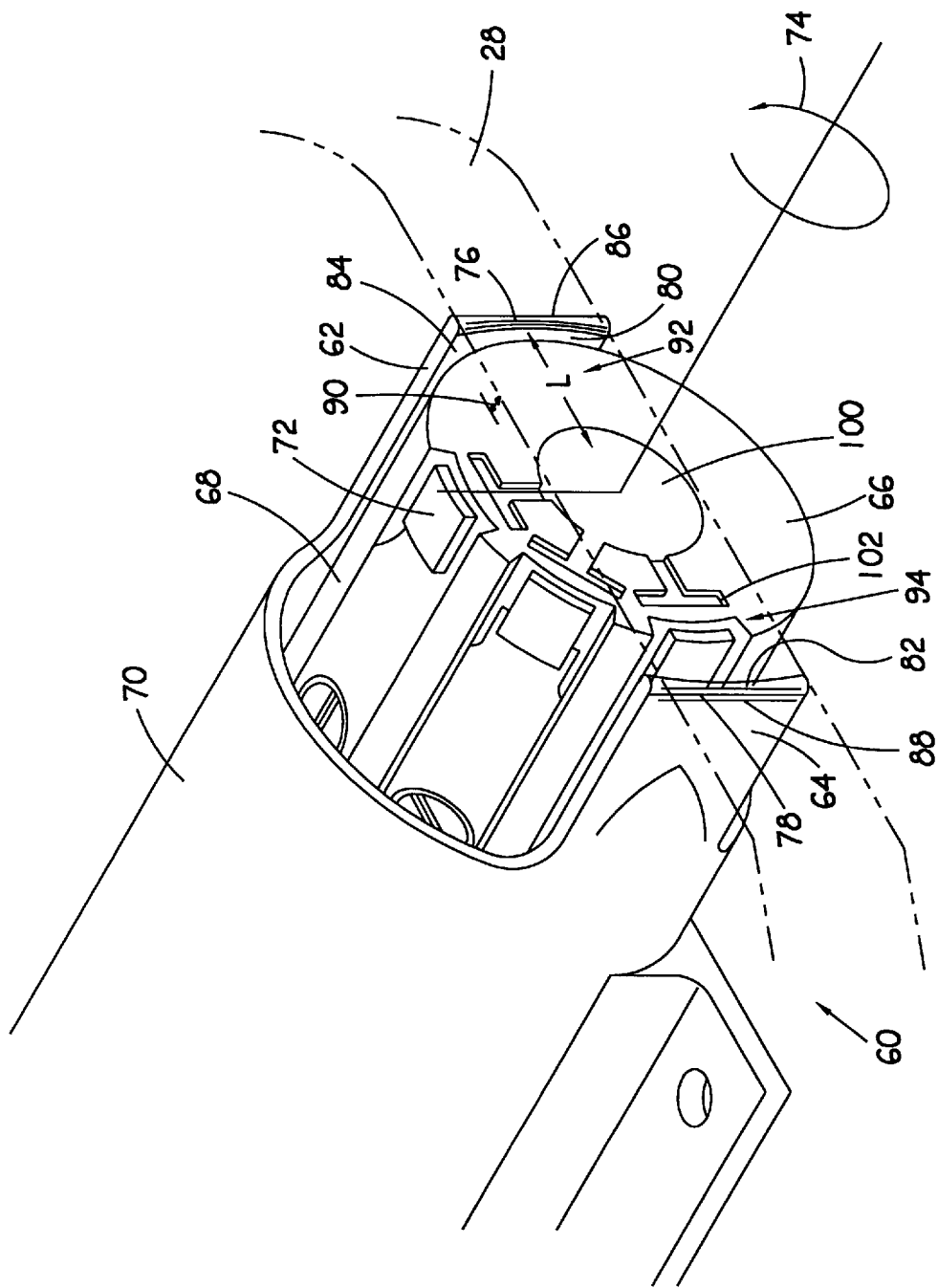
FIG. 4 is a perspective view of a tape support system which may be used with a generally planar transducer end face.

As the tape 308 advances through the read/write zone 314, data is recorded ("written") or read ("played back") from the tape by means of a rotary head transducer assembly 322. The rotary head transducer assembly 322 is fixed to the frame 302 by means of a mounting flange 320. FIG. 4 is a perspective view of a rotary head transducer assembly 60 with a pair of tape supports 62, 64 adjacent to the end face 66. The transducer drum 68 rotates in an outer shroud 70 so that the transducers 72 trace a circular transducing path 74.

The tape supports 62, 64 have curved support surfaces 76, 78 that extend along the longitudinal axis "L" of the tape 28. The inner surfaces 80, 82 of the tape supports 62, 64 are contoured to the shape of the transducer drum 68 to minimize the gap therebetween. As will be discussed in connection with FIG. 5, the gap 84 between the tape supports 62, 64 and the transducer drum 68 preferably is uniform and small.

Straight outer edges 86, 88 of the tape supports 62, 64 are oriented perpendicular to the longitudinal axis "L" of the tape 28. The straight outer edges 86, 88 maintain the tape 28 in a generally planar configuration as it passes past the generally planar end face 66 of the transducer drum 68. It will be understood that it may be desirable to maintain the tape 28 in a generally planar configuration for engagement with a non-planar end face. (see FIGS. 1 and 2).

The tape support 62 extends above the end face 66 of the transducer drum 68 so that a separation 90 is formed proximate the non-contact segment 92 of the transducer path 74. Tape support 64 is sized so that the transducer 72 contacts the tape 28 at the read/write location 94 of the transducer path 74.

As will be discussed in connection with FIGS. 11 and 12, the transducer drum 68 has a center hole 100 which is connected to a low pressure source (not shown). A series of low pressure distribution slots 102 in fluid communication with the center hole 100 are provided in the end face 66 to distribute the low pressure condition proximate to the transducers 72 to enhance tape-to-head contact.

Figure 5:
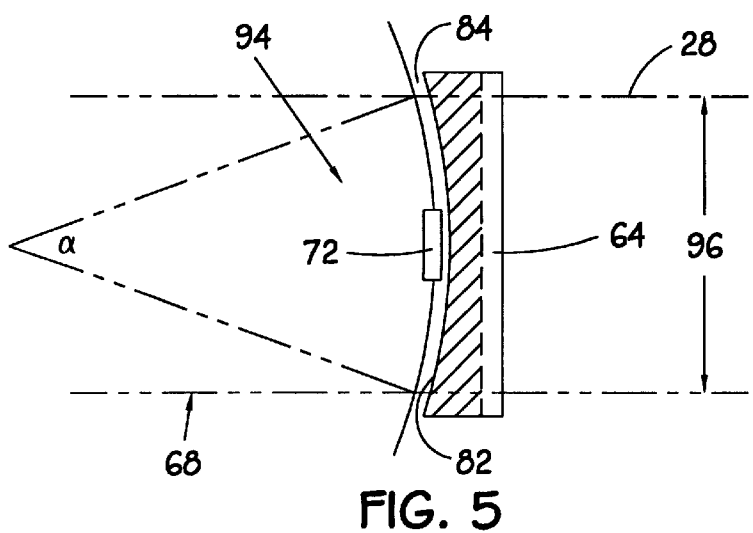
FIG. 5 is a schematic illustration of the read/write location of the transducer path and its relation to a tape support system.

FIG. 5 is a schematic illustration of the theoretical maximum read/write location 94 of the transducer path 74. It will be understood that as a practical matter, a portion of the tape edges will be unused. For example, in one embodiment 0.007" (0.1778 mm) of each edge was unused. On a standard quarter inch tape (6.35 mm), the unused portion represents 6.0% of the tape width. While this fact results in under utilization of the tape, it is preferred that the transducer drum not intersect directly with the edges of the tape due to possible tape damage and wear to the transducers 72.

Since the end face 68 has a diameter larger than the width 96 of the tape 28, the angle $\alpha$ is less than 180°, and preferably between 30–60°. The gap 84 between the perimeter of the end face 68 and the inner surface 82 of the tape support 64 is small so that the tape 28 receives maximum support. Additionally, if the gap 84 is uniform, cross-web tension variations are minimized.

Figure 6:
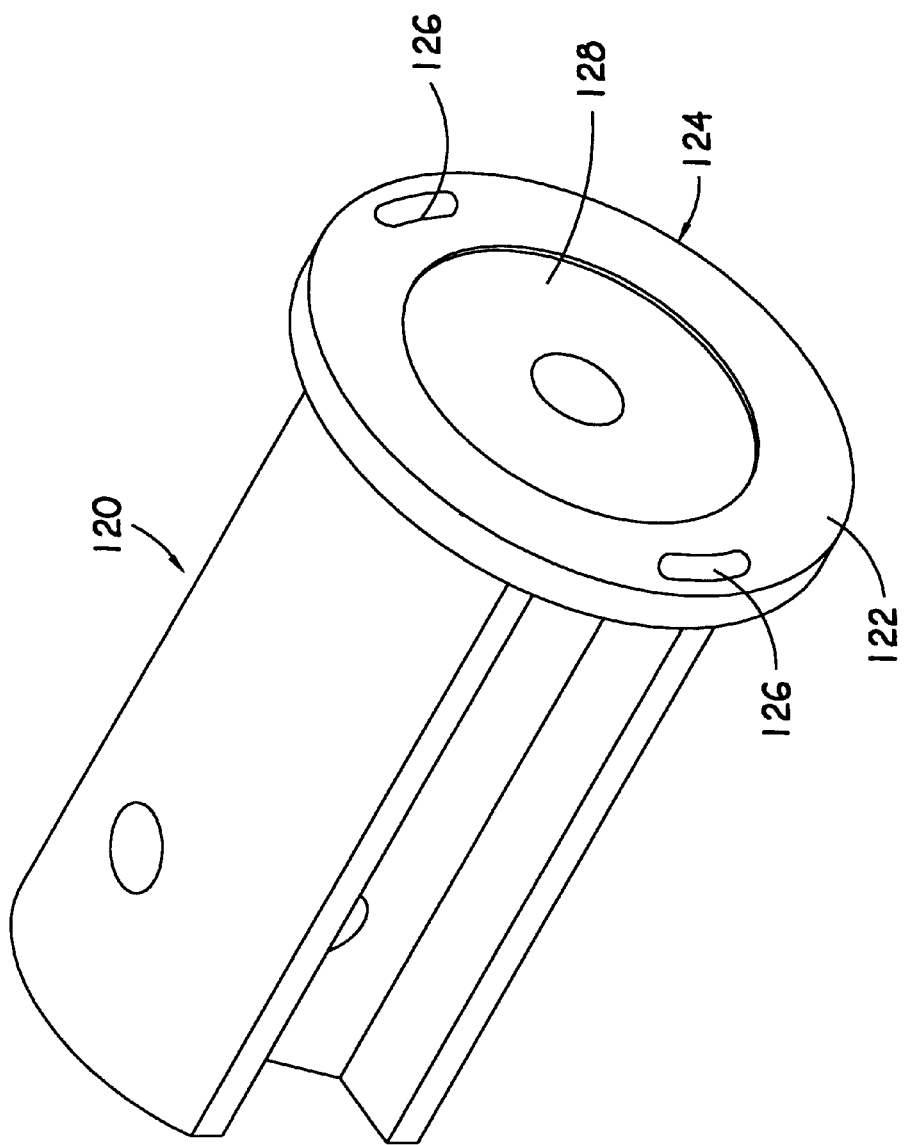
FIG. 6 is a perspective view of an alternate transducer drum in which a portion of a tape support system is an integral part of the end face.

FIG. 6 is a perspective view of an alternate transducer drum 120 with a tape support surface or ridge 122 extending above the datum of the surface 128 of the end face 124. Transducer mounting slots 126 are provided along the tape support surface 122 for retaining transducers (not shown). The transducers protrude above the surface 122 by less than about 0.0015" (0.0381 mm). Because the protrusion of the head is fixed relative to the surface 122, penetration of the transducers into the tape is fixed, resulting in good head-to-tape penetration over a longer portion of the read/write location of the transducer path. The surface 122 may be planar, curved or some other suitable shape.

The support surface 122 rotates with the transducers to provide a stable surface which rides on the surface of the tape (not shown). When the drum 120 is rotating and the surface 122 is pushed into the plane of the tape, tape tension causes the tape to be flattened against the surface 122. The surface 122 is made of a hard material, or provided with a coating to resist wear and tape friction. In an embodiment for use with a 0.25" (6.35 mm) wide tape, the surface 122 preferably is approximately 0.218" (5.537 mm) wide, with an overall diameter of 0.70" (17.78 mm).

Figure 7:
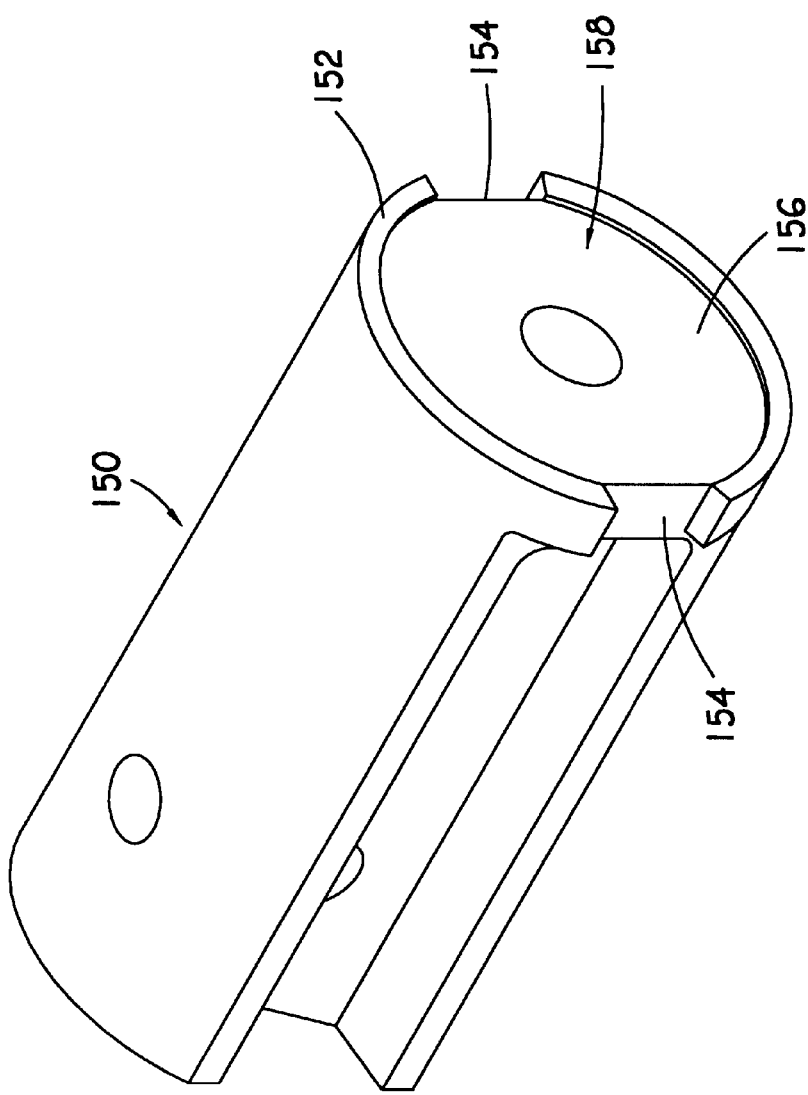
FIG. 7 is an alternate embodiment of the transducer drum illustrated in FIG. 6 in which the transducers are located in slots around the perimeter of the end face.

FIG. 7 is an alternate modified transducer drum 150 in which the tape support surface 152 extends above a datum plane 156 of end face 158. Mounting slots 154 are provided for the transducers. In an embodiment for use with a 0.25" (6.35 mm) wide tape, the surface 152 is approximately 0.78" (19.81 mm) wide, and has an overall diameter of 0.56" (14.22 mm). The surface 152 may be planar, curved or some other suitable shape.

Figure 17:
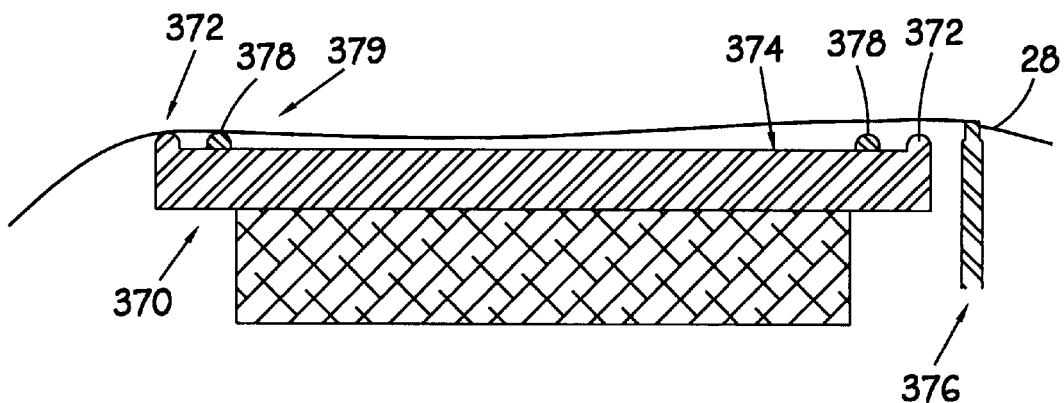
FIG. 17 is a side view of an alternate transducer drum with a tape support integrally formed in the end face and a tape support arm.

FIG. 17 is a side view of an alternate transducer drum 370 with an active tape support surface 372 integrally formed on the outer periphery of the end face 374. A passive tape support arm 376 is provided on one side of the drum 370 to lift the tape 28 out of contact with the adjacent transducer 378. The transducers 378 engage the tape 28 along a read/write location 379, opposite the passive tape support arm 376. The tape 28 may also rest on the end face 374 in some applications.

The datum of active tape support surface 372 is slightly below the transducers 378 by a few microns (0.001 to 0.005 mm). This configuration improves head-to-tape contact near the physical edges of the tape 28 and allows for more consistent recording performance throughout the arc of the transducers across the tape.

Figure 18:
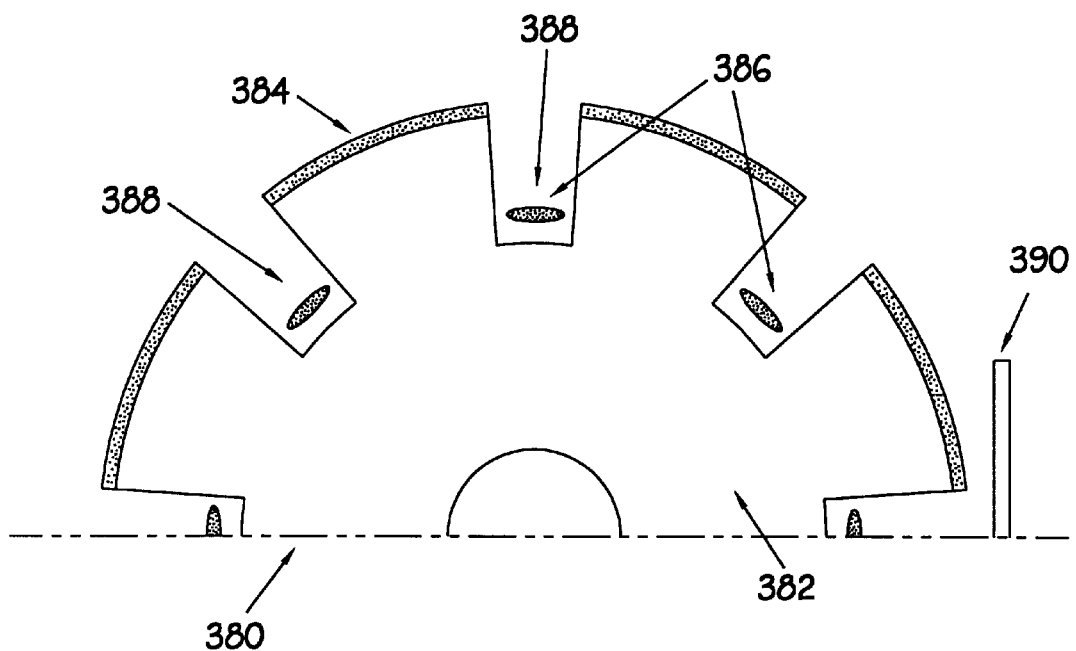
FIG. 18 is an end view of an alternate transducer drum with a tape support integrally formed in an end face and transducers located in recessed mounting slots.

FIG. 18 is an end view of an alternate transducer drum 380 with an active tape support surface 384 integrally formed around the periphery of the end face 382. Transducers 386 are located in recessed mounting slots 388 cut into the periphery of the drum 380. The slots 388 are deeper than those shown in FIG. 7 so that the transducers 386 can be located further away from the passive tape support arm 390.

Figure 8:
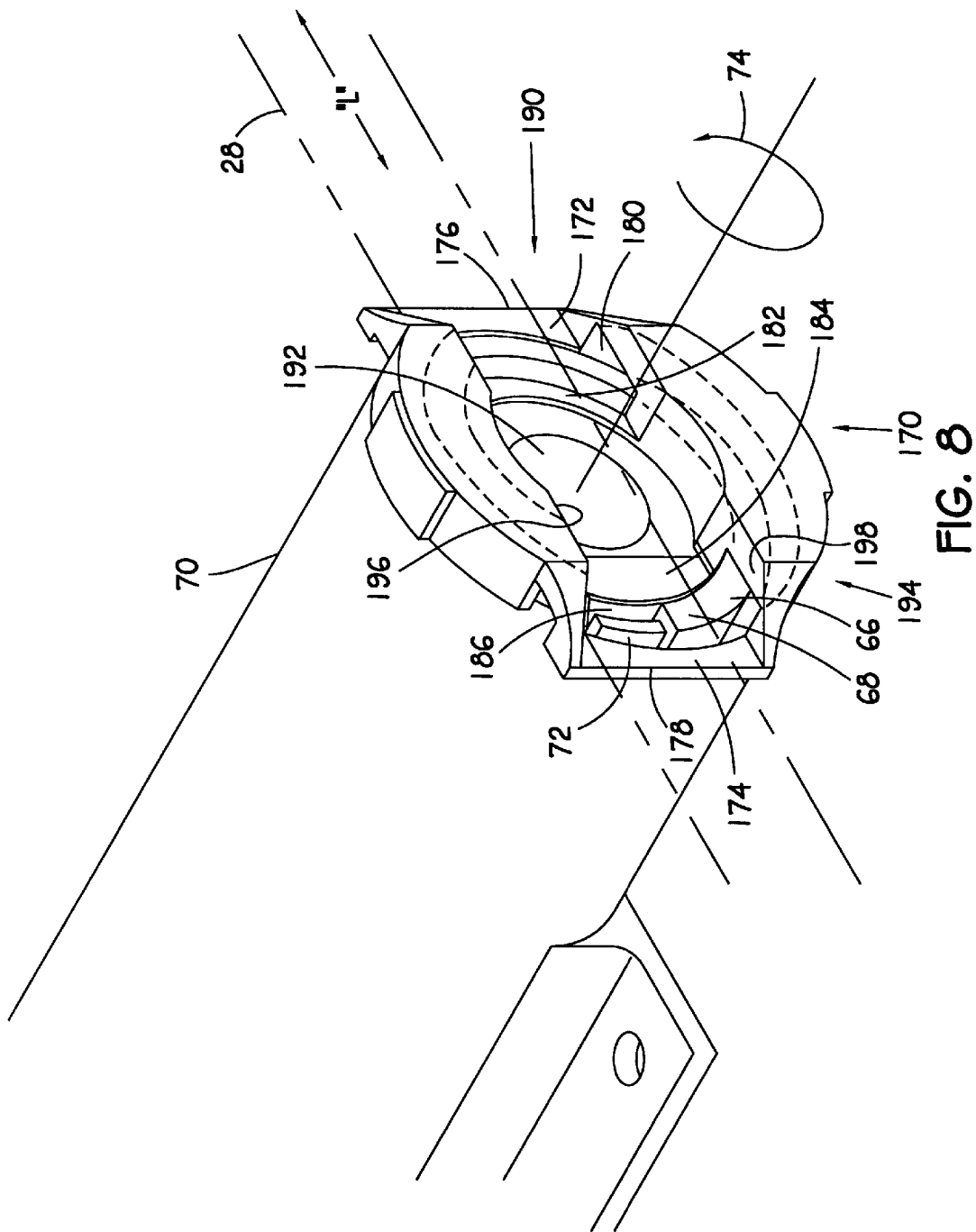
FIG. 8 is a perspective view of a tape guide structure which may be interposed between the end face of a transducer and a magnetic tape.

FIG. 8 illustrates a tape support system comprising a tape support platform 170 attached to the outer shroud 70. The tape support platform 170 is interposed between the tape 28 and the end face 66 of the transducer drum 68. Outer tape support surfaces 172, 174 have straight tape transition edges 176, 178 which are perpendicular to the longitudinal axis "L" of the tape 28.

The tape support platform 170 has a circular transducer slot 180 which allows the transducers 72 to rotate freely along the transducer path 74. A pair of inner tape support surfaces 182, 184 are provided adjacent to the outer tape support surfaces 172, 174, respectively. A transducer opening 186 is located between the inner and outer tape support surfaces 172, 174, 182, 184. The extensive tape support surfaces 172, 174, 182, 184 provide enhanced mechanical stability of the tape 28 relative to the transducers 70.

As is discussed in connection with the above embodiments, the tape support surfaces 172 and 182 are raised so that the tape 28 does not engage the transducers 72 along the non-contact segment 190 of the transducer path 74. Alternatively, the transducer drum 68 may be tipped relative to the tape support platform 170 to achieve the same result. Upper and lower tape edge guides 196, 198 add mechanical stability to the tape support platform 170. It will be understood that the distance between the upper and lower tape edge guides 196, 198 may be greater than the width of the tape. However, in some circumstances the upper and lower guides 196, 198 may actually guide the tape 28. As will be discussed in greater detail below, a center hole 192 is provided for transmitting a reduced pressure condition to the tape 28 to enhance contact between the transducers 72 and the tape 28 at the read/write location 194 of the transducer path 74.

The tape support platform 170 provides more mechanical stability to the tape 28, allows for higher pressures between the transducers 72 and the tape 28, increases the signal strength by providing good head-to-tape contact across substantially the full width of the tape 28, is less sensitive to transducer penetration differences that occur during mass production, and provides tape edge guides that may reduce vertical movement and the need to servo the rotary head transducer.

Figure 9:
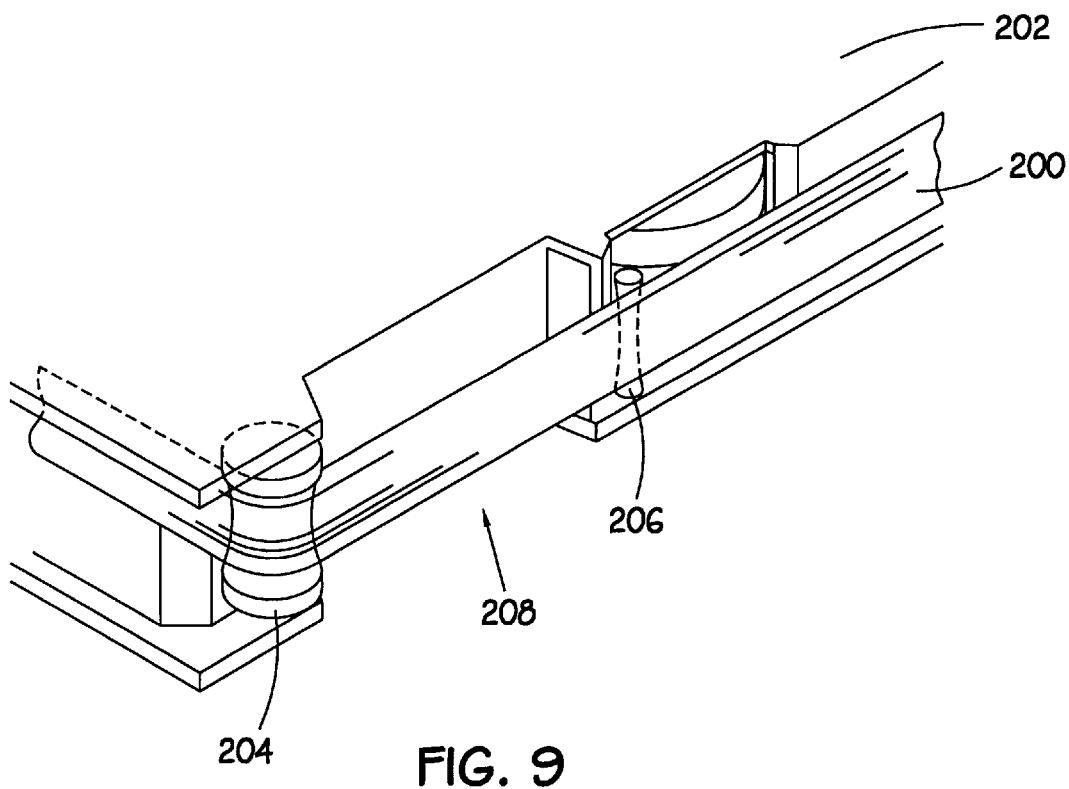
FIG. 9 is a perspective view of a cartridge for holding the magnetic tape in which curved tape supports are attached to a cartridge housing.
Figure 10:
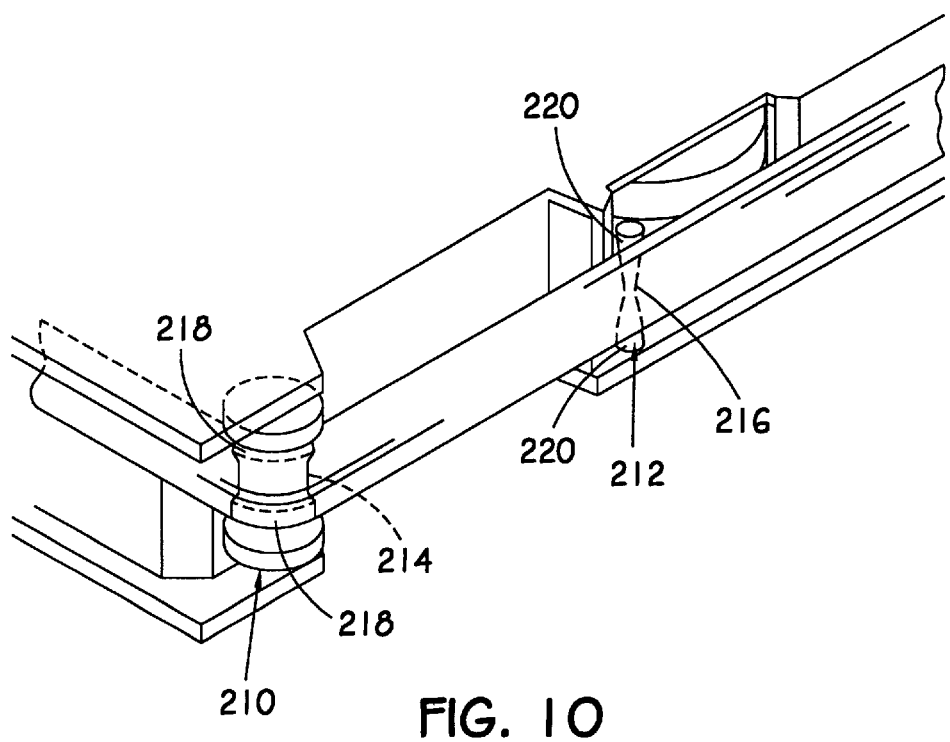
FIG. 10 is a perspective view of a cartridge for holding the magnetic tape in which tapered or chamfered tape supports are attached to the cartridge housing.

FIG. 9 illustrates tape 200 retained in a cartridge 202 for engagement with a rotary head transducer. In this alternate embodiment, a tape guide 204 and wrap pin 206 are attached to the cartridge 202 on opposite sides of the read/write zone 208. The tape guide 204 and wrap pin 206 do not rotate. As discussed above, the tape supports 204, 206 may be curved or contoured to flex the tape into a shape that is complementary to the end face of a rotary transducer (not shown). FIG. 10 illustrates chamfered tape guide 210 and wrap pin 212 with curved center portions 214, 216 and straight edge portions 218, 220.

In one embodiment, the contour of the tape guide 204 is constant, with a depth of 0.005" (0.127 mm) at the center of the guide 204. In another embodiment, the tape guide 210 has a chamfer extending 0.015" (0.381 mm) from the top and the bottom flanges, and has a depth of cut of 0.005" (0.127 mm) at the center of the guide.

However, the tape edges may be damaged if tape guides 204, 210 are tapered because of the large strain induced in the tape due to the pre-shaping of the tape in combination with the wrap angle of more than 90° around the tape guides 204, 210. In particular, the tape guides 204, 210 impose compound curves on the tape 200, which accelerates tape wear. On the other hand, the small wrap angle around the wrap pins 206, 212 causes significantly less tape wear.

FIG. 15 illustrates an embodiment in which a tape guide 222 has straight edges 224. A wrap pin 226 with a curvilinear or chamfered shape is provided for flexing the tape 200. The advantage of the contoured wrap pin 226 is that the small wrap angle at the pin 226 minimizes tape strain.

Figure 22:
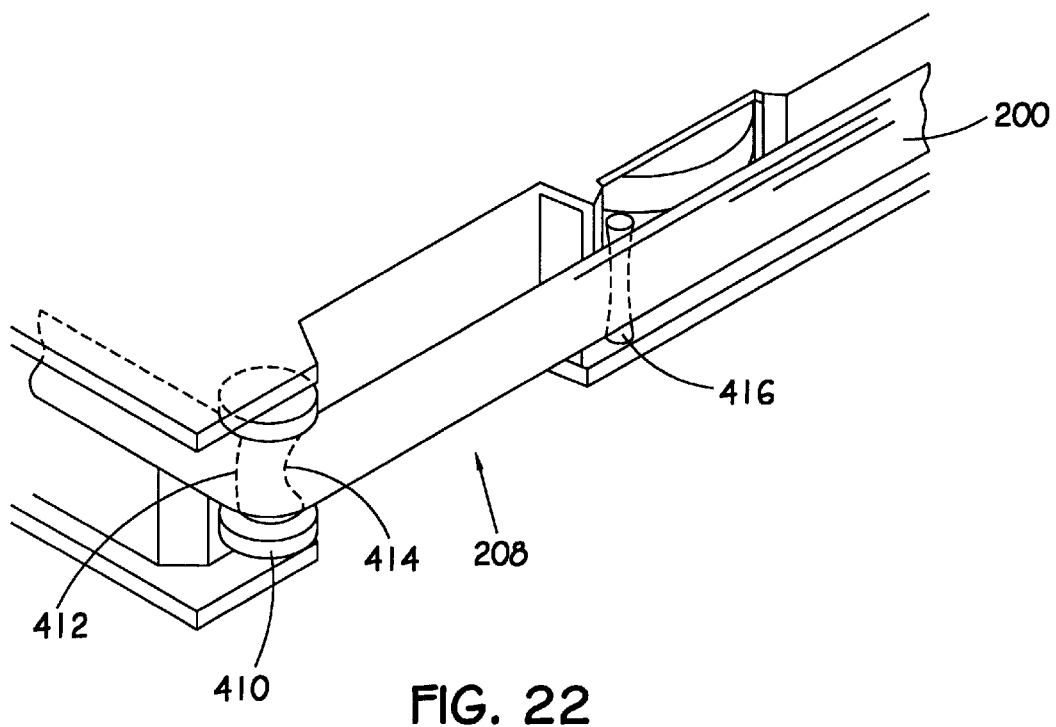
FIG. 22 is a perspective view of a cartridge for holding the magnetic tape with an asymmetrical tape guide.

FIG. 22 illustrates an embodiment with a non-rotating asymmetrical tape guide 410. The tape guide 410 has a straight edge 412 for the majority of the wrap angle to minimize tape strain and a curvilinear edge 414 adjacent to the read/write zone 208 to cup or pre-shape the tape 200 to achieve improved coupling with the end face of a rotary transducer (not shown). A symmetrical wrap pin 416 may be used with the asymmetrical tape guide 410.

In another embodiment, the yaw of the transducer drum 32" is tipped (see FIG. 3) so that the read/write location 36" is between 0.1" and 0.4" from the wrap pins 206, 212, 226, 416. This right-hand tribology configuration permits the transducers 34" to penetrate more deeply into the tape 28, 200 for improved transducer-to-tape interface and greater tolerance to manufacturing variations. Right-hand tribology may be combined with a curved or conical end face 30' on the transducer drum 32' (see FIG. 2). It will be understood that if the span between the read/write location and the wrap pin exceeds 0.5", the tape may wrap around to the inactive side of the end face.

Figure 23:
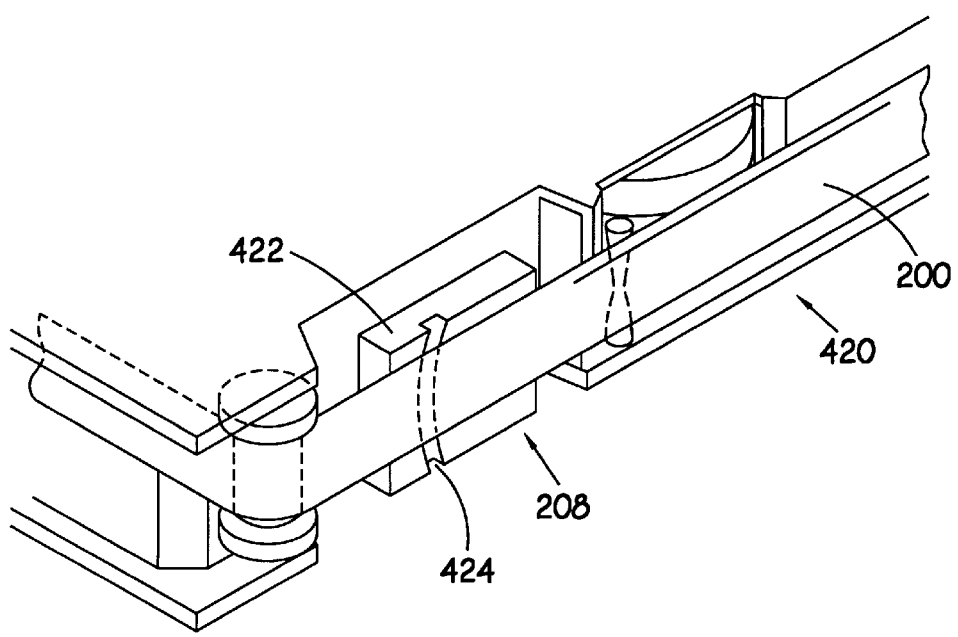
FIG. 23 is a perspective view of a cartridge with an tape support pad behind the magnetic tape.

FIG. 23 illustrates a cartridge 420 in which a tape support pad 422 is located behind the tape 200 in the read/write zone 208. The tape support pad 422 may optionally include a curved slot 424 corresponding to the path traversed by the transducer along the read/write location. The transducer heads may protrude into the curved slot 424, so that the tape 200 wraps around the transducer heads. The tape support pad 422 may be constructed of a compliant materials, such as for example felt or some other fibrous material. Alternatively, the pad 422 may be constructed of a rigid material, such as for example plastic.

Figure 24:
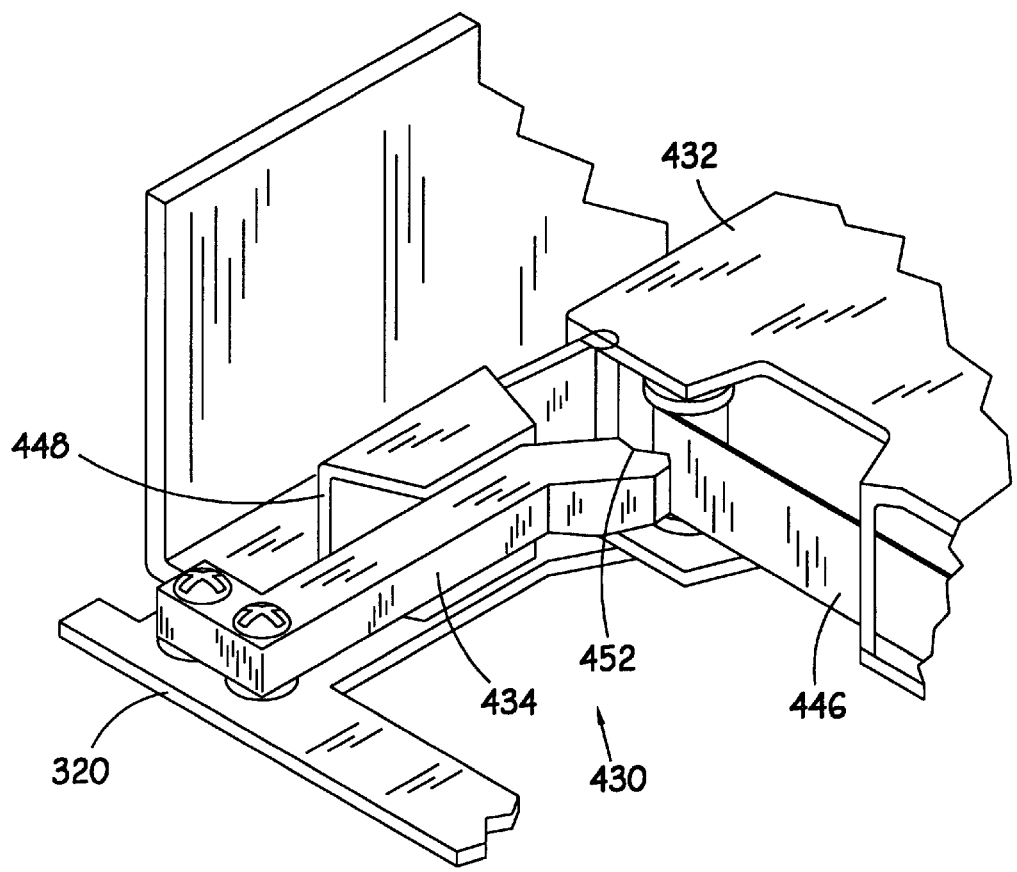
FIG. 24 is a perspective view of a mechanical registration system for a tape cartridge.
Figure 25:
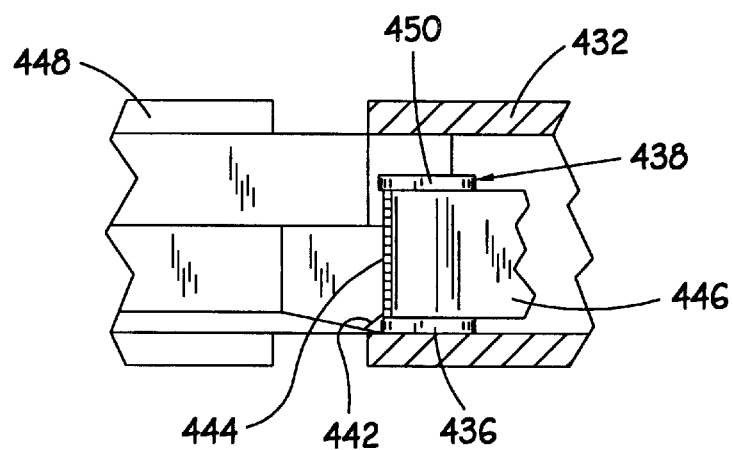
FIG. 25 is a side view of a registration arm for a tape cartridge.

A tape cartridge may be registered to a tape drive by engaging the base plate of the cartridge with mechanical stops on the tape drive. FIGS. 24 and 25 illustrate an alternate tape registration system 430 for registering a tape cartridge 432 with a rotary head transducer assembly 322 (see FIG. 16). A registration arm 434, preferably mounted to the mounting flange 320 (see FIG. 16), engages a lower flange 436 on a tape guide 438. Mounting the registration arm 434 on the mounting flange 320 minimizes tolerance build-up between the tape guide 438 and the transducer assembly 322. Alternatively, the registration arm 434 may be mounted to any suitable surface proximate the rotary head transducer assembly 322.

A distal end 440 of the registration arm has a curved or angled surface 442 which permits smooth engagement and disengagement with the lower flange 436 on the cartridge 432. The end face 444 also has a vertically oriented V-shaped or curved contour 452 which approximates the circular profile of the flange 436. As is shown in FIG. 25, end face 444 of the registration arm 434 does not extend past the flange 436 far enough to contact a tape 446, so that movement of the tape 446 in the cartridge 432 is not interrupted. It will be understood that the end face 444 of the registration arm 434 may be configured to engage with top flange 450, or both flanges 436, 450 simultaneously. The registration system 430 is engaged by sliding the cartridge 432 into a loading mechanism (see FIG. 16). The loading mechanism opens the tape cover 448 to expose the tape 446. Upon complete insertion, the lower flange 436 of the tape guide 438 mechanically engages with the surface 442.

Figure 11:
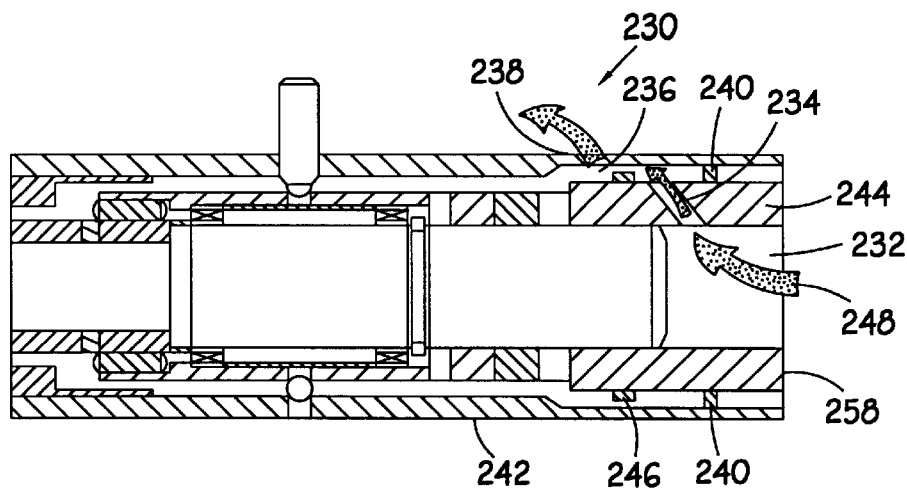
FIG. 11 is a side view of a rotary head transducer assembly with a center opening for transmitting a reduced pressure condition to the tape to promote engagement with the transducers.

FIG. 11 is a sectional view of a rotary head transducer 230 having a center hole 232 in fluid communication with a transducer drum air vent 234 leading into a chamber 236. An outer shroud air hole 238 is provided for releasing pressure buildup in the chamber 236. Seals 240 are placed between the inside surface of the outer shroud 242 and the transducer drum 244. Blades 246 are attached to the outside surface of the transducer drum 244 to draw air through the center hole 232 according to the arrows 248.

The blades 246 use the shroud 242 as a stator to create sub-ambient pressure at the interface between the end face 258 and the tape (not shown). As is shown in FIG. 12, low pressure distribution slots 256 in the end face 258 route the airflow through the center hole 232 so that the sub-ambient pressure occurs adjacent to the transducers 72.

Figure 12:
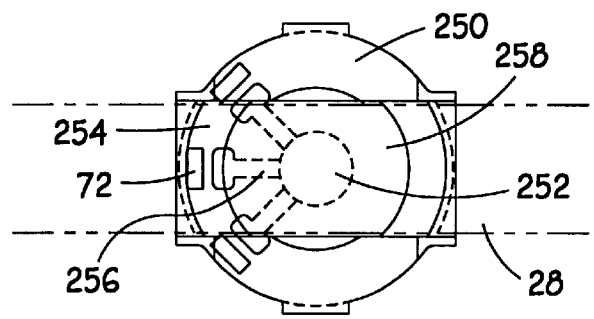
FIG. 12 is an end view of one embodiment of a rotary transducer assembly illustrating low pressure distribution slots in communication with the center opening.

FIG. 12 illustrates an alternate tape support platform 250 which substantially covers the end face 258 of the transducer drum (not shown). Since the end face 258 is substantially enclosed by the tape support platform 250, the reduced pressure condition is concentrated generally proximate the transducer opening 254. Consequently, the tape 28 is drawn to the opening 254 for improved engagement with the passing transducers 72.

Figure 21:
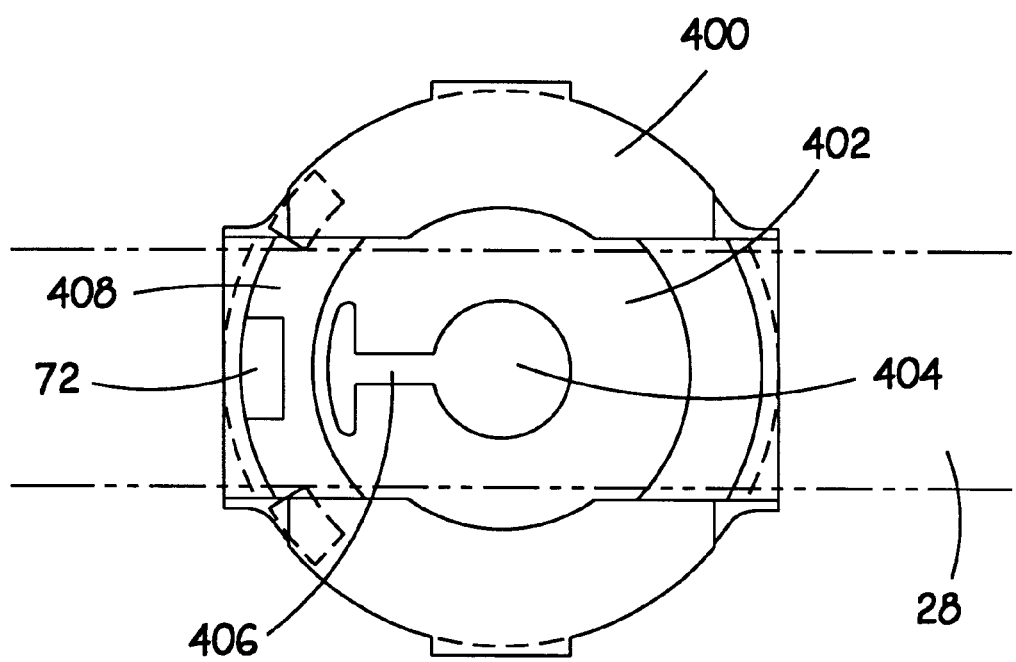
FIG. 21 is an end view of a rotary transducer with a tape guide structure having low pressure distribution slots.

FIG. 21 is an end view of another alternative tape support platform 400 which substantially covers the end face of the transducer drum (not shown). A center hole 404 and low pressure distribution slot 406 proximate the transducer opening 408 are cut into the tape support surface 402 of the tape support platform 400. The low pressure condition draws the tape 28 against the tape support surface 402 to enhance engagement of the transducer 72 with the tape 28 at the transducer opening 408.

Figure 13:
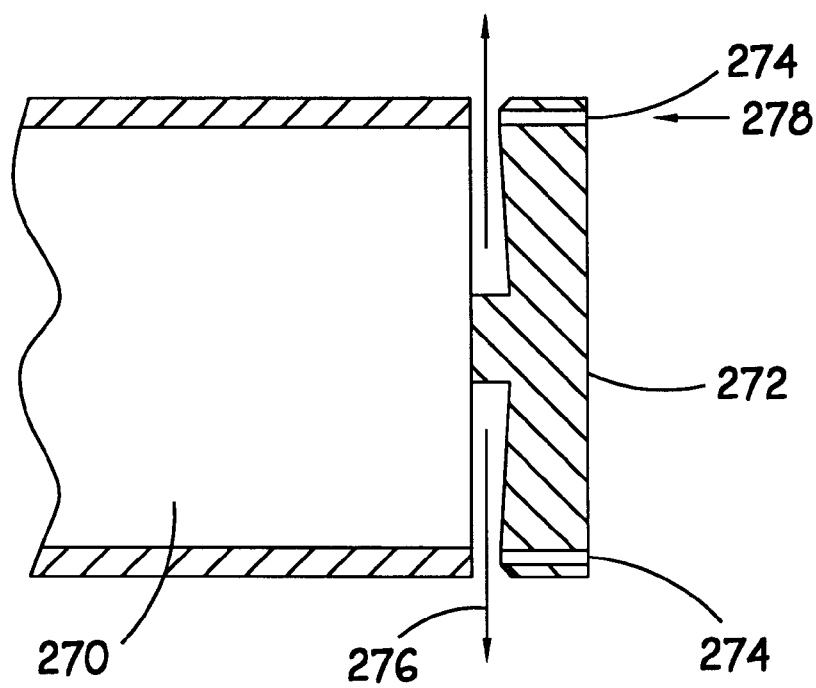
FIG. 13 is a side view of an alternate rotary head transducer assembly in which a slot is provided behind the transducer carrier for promoting the transmission of air through the end face.
Figure 14:
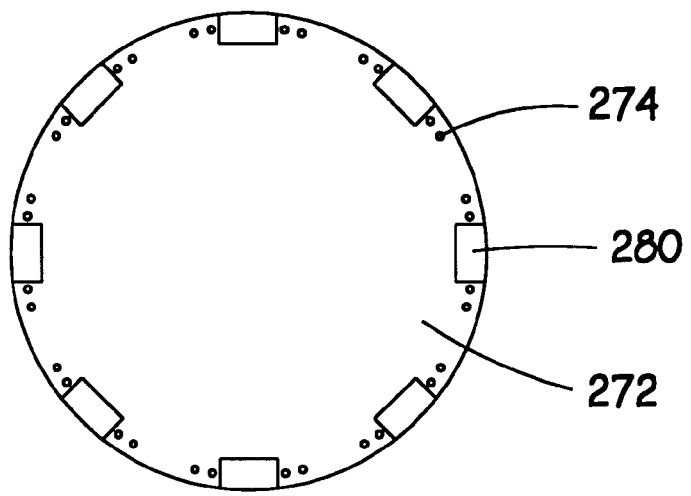
FIG. 14 is an end view of an alternate end face in which air may be drawn through a plurality of holes adjacent to the transducers to promote engagement with the magnetic tape.

FIG. 13 is a sectional view of an alternate rotary transducer drum 270 in which a transducer plate 272 has a plurality of air holes 274 connected to an air gap 276 for drawing air 278 from the end face 272 out through the air gap 276. FIG. 14 is an end view of the transducer plate 272 containing eight transducers 280 and a plurality of air holes 274 adjacent thereto.

While the above embodiments disclose various quantities of transducers, it should be understood that the number of transducers in the exemplary embodiments in no way limits the scope of the invention.

Other modifications of the invention will be apparent to those skilled in the art in view of the foregoing descriptions. These descriptions are intended only to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

We claim:

1. An apparatus for engaging a magnetic tape with a transducer at a read/write zone, the magnetic tape being mountable in the apparatus with a longitudinal axis passing through the read/write zone and the magnetic tape having a center and edges with respect to a width of the magnetic tape, the apparatus comprising:

a rotating transducer carrier with an end face proximate the read/write zone, the transducer carrier having an axis of rotation which passes through the tape at the read/write zone;

at least one transducer for reading and writing arcuate information tracks generally laterally across the tape located on the end face of the rotating transducer carrier so that the transducer traces a substantially circular transducing path through the read/write zone with the axis of rotation corresponding substantially to the center of the transducing path, the transducing path having a read/write location; and a tape support system generally adjacent to the read/write location for positioning the tape so that the at least one transducer penetrates into a tape surface along the read/write location, the tape support system comprising at least one tape support having a tape support surface capable of directly engaging and supporting the tape and extending generally laterally across a front side of the tape, at least a portion of the tape support surface having a rounded shape such that said tape support surface is capable of extending into a plane of the tape to a different degree at the center of the tape than at the edges of the tape.

2. The apparatus of claim 1 wherein the axis of rotation is generally non-orthogonal to a tape plane.

3. The apparatus of claim 1 wherein the axis of rotation is generally non-orthogonal to a tape plane and the end face comprises a generally convex surface and the at least one transducer is located proximate the periphery of the end face.

4. The apparatus of claim 1 wherein said tape support surface is provided on the end face.

5. The apparatus of claim 1 wherein said tape support surface is radially adjacent at least a portion of the rotating transducer carrier.

6. An apparatus for engaging a magnetic tape with a transducer at a read/write zone, the magnetic tape being mountable in the apparatus with a longitudinal axis passing through the read/write zone, the apparatus comprising:

a rotating transducer carrier with an end face proximate the read/write zone, the transducer carrier having an axis of rotation which passes through the tape at the read/write zone;

at least one transducer for reading and writing arcuate information tracks generally laterally across the tape located on the end face of the rotating transducer carrier so that the transducer traces a substantially circular transducing path through the read/write zone and defining a datum plane, with the axis of rotation corresponding substantially to the center of the transducing path, the transducing path having a read/write location; and a tape support system generally adjacent to the read/write location for positioning the tape so that the at least one transducer penetrates into a tape surface along the read/write location, the tape support system comprising at least one tape support having first and second tape support surfaces extending past said datum plane in substantially equal amounts and directly engaging and supporting the tape, the axis of rotation of said rotating transducer carrier intersecting said tape at an oblique angle.

7. An apparatus for engaging a magnetic tape with a transducer at a read/write zone, the magnetic tape being mountable in the apparatus with a longitudinal axis passing through the read/write zone, the apparatus comprising:

a rotating transducer carrier with an end face proximate the read/write zone, the transducer carrier having an axis of rotation which passes generally non-orthogonally through a tape plane at the read/write zone;

at least one transducer for reading and writing arcuate information tracks generally laterally across the tape located on the end face of the rotating transducer carrier so that the transducer traces a substantially circular transducing path through the read/write zone with the axis of rotation corresponding substantially to the center of the transducing path, the transducing path having a read/write location; and a tape support system proximate to the read/write zone for positioning the tape so that the at least one transducer penetrates into a tape surface along the read/write location, the tape support system comprising a tape support on the end face extending above a datum plane defined by the at least one transducer for directly engaging and supporting the tape.

8. The apparatus of claim 7 wherein the end face comprises a generally conical shape.

9. The apparatus of claim 7 wherein the end face has a generally convex surface.

10. The apparatus of claim 7 wherein the tape support system further includes a second tape support adjacent to the transducer carrier with a tape support surface for flexing the tape into a shape generally complementary to the end face of the transducer carrier.

11. An arcuate scanning tape drive comprising:

a loading mechanism for receiving a container holding a magnetic tape and for positioning the magnetic tape at a recording location;

transport means for transporting the magnetic tape longitudinally past a read/write zone;

a rotating transducer carrier with an end face proximate the read/write zone, the transducer carrier having an axis of rotation which passes through the tape at the read/write zone;

at least one transducer for reading and writing arcuate information tracks generally laterally across the tape located on the end face of the rotating transducer carrier so that the transducer traces a substantially circular transducing path through the read/write zone with the axis of rotation corresponding substantially to the center of the transducing path, the transducing path having a read/write location; and a tape support system generally adjacent to the read/write location for positioning the tape so that the at least one transducer penetrates into a tape surface along the read/write location, the tape support system comprising at least one tape support having a tape support surface capable of directly engaging and supporting a front side of the tape and extending generally laterally across a width of the tape, at least a portion of the tape support surface having a rounded shape such that the tape support surface extends into a plane of the tape to a different degree at a center of the tape with respect to the tape width than at the edges of the tape with respect to the tape width.

12. The arcuate scanning tape drive of claim 11 wherein said tape support surface is provided on the end face.

13. The arcuate scanning tape drive of claim 11 wherein said tape support surface is radially adjacent at least a portion of the rotating transducer carrier.

14. An arcuate scanning tape drive comprising:

a loading mechanism for receiving a container holding a magnetic tape and for positioning the magnetic tape at a recording location;

transport means for transporting the magnetic tape longitudinally past a read/write zone;

a rotating transducer carrier with an end face proximate the read/write zone, the transducer carrier having an axis of rotation which passes generally non-orthogonally through a tape plane at the read/write zone;

at least one transducer for reading and writing arcuate information tracks generally laterally across the tape located on the end face of the rotating transducer carrier so that the transducer traces a substantially circular transducing path through the read/write zone with the axis of rotation corresponding substantially to the center of the transducing path, the transducing path having a read/write location; and a tape support system generally adjacent to the read/write location for positioning the tape so that the at least one transducer penetrates into a tape surface along the read/write location, the tape support system comprising a generally conical tape support on the end face extending above a datum plane defined by the at least one transducer for directly engaging and supporting the tape.

15. A tape support system for engaging a magnetic tape with a transducer at a read/write zone, the magnetic tape including a longitudinal axis passing through the read/write zone and the magnetic tape having a center and edges with respect to a width of the magnetic tape, the system comprising:

means for positioning the tape so that at least one transducer penetrates into a tape surface along a read/write location such that the means for positioning extends into a plane of the tape to a different degree at the center of the tape than at the edges, wherein said means includes at least one tape support having a tape support surface for extending generally laterally across the tape such that said tape support surface directly engages and supports the tape.

* * * * *